United States Patent
Otani

(10) Patent No.: US 12,397,548 B2
(45) Date of Patent: Aug. 26, 2025

(54) IMAGE PROCESSING APPARATUS, THRESHOLD MATRIX GENERATION APPARATUS, CONTROL METHODS THEREFOR, AND NON-TRANSITORY COMPUTER-READABLE STORAGE MEDIUM

(71) Applicant: CANON KABUSHIKI KAISHA, Tokyo (JP)

(72) Inventor: Ryosuke Otani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 244 days.

(21) Appl. No.: 18/338,740

(22) Filed: Jun. 21, 2023

(65) Prior Publication Data

US 2024/0001670 A1   Jan. 4, 2024

(30) Foreign Application Priority Data

Jul. 1, 2022   (JP) .................................. 2022-107357

(51) Int. Cl.
| | | |
|---|---|---|
| *B41J 2/045* | (2006.01) | |
| *B41J 2/21* | (2006.01) | |
| *G06K 15/02* | (2006.01) | |
| *H04N 1/405* | (2006.01) | |

(52) U.S. Cl.
CPC ......... *B41J 2/04595* (2013.01); *B41J 2/0458* (2013.01); *B41J 2/2146* (2013.01); *G06K 15/1876* (2013.01); *G06K 15/1881* (2013.01); *H04N 1/4051* (2013.01); *G06K 2215/101* (2013.01)

(58) Field of Classification Search
CPC .... B41J 2/04595; B41J 2/0458; B41J 2/2146; G06K 15/1876; G06K 15/1881; G06K 2215/101; H04N 1/4051
See application file for complete search history.

(56) References Cited

U.S. PATENT DOCUMENTS

2009/0310161 A1 * 12/2009 Kawamura .......... H04N 1/4052
358/1.9

FOREIGN PATENT DOCUMENTS

| JP | 2017200003 A | * | 11/2017 | ............... H04N 1/46 |
| JP | 2018140605 A | * | 9/2018 | ............... H04N 1/52 |
| JP | 2020-15303 A | | 1/2020 | |

OTHER PUBLICATIONS

U.S. Appl. No. 18/339,435, filed Jun. 22, 2023 by Ryosuke Otani.

* cited by examiner

*Primary Examiner* — Yaovi M Ameh
(74) *Attorney, Agent, or Firm* — VENABLE LLP

(57) ABSTRACT

An image processing apparatus converts, based on a threshold matrix in which thresholds are arrayed, input image data into a first dot pattern representing dots recorded by a recording head, and obtains a second dot pattern representing dots recorded by each of L number of the nozzle arrays by assigning the dots of the first dot pattern to each of the nozzle arrays so that each nozzle of the recording head is used in a cycle of L. A power spectrum in a frequency domain of the first dot pattern has a blue noise characteristic or a green noise characteristic in which power in a low frequency band is suppressed, and power is suppressed at a frequency corresponding to the cycle of L and at frequencies of multiplications of the frequency.

10 Claims, 13 Drawing Sheets

FIG. 6
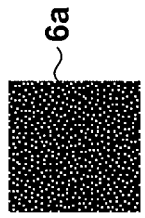
DOT PATTERN BEFORE NOZZLE ASSIGNMENT
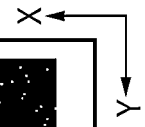

FIG. 7

FIG. 9
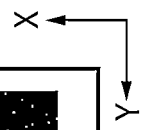
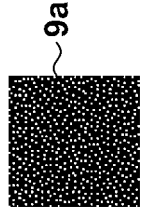

| | |
|---|---|
| ASSIGNMENT PATTERN 1 | <table><tr><td>1</td><td>1</td><td>1</td><td>1</td><td>1</td><td>1</td><td>1</td><td>1</td></tr><tr><td>2</td><td>2</td><td>2</td><td>2</td><td>2</td><td>2</td><td>2</td><td>2</td></tr><tr><td>3</td><td>3</td><td>3</td><td>3</td><td>3</td><td>3</td><td>3</td><td>3</td></tr><tr><td>4</td><td>4</td><td>4</td><td>4</td><td>4</td><td>4</td><td>4</td><td>4</td></tr><tr><td>5</td><td>5</td><td>5</td><td>5</td><td>5</td><td>5</td><td>5</td><td>5</td></tr><tr><td>6</td><td>6</td><td>6</td><td>6</td><td>6</td><td>6</td><td>6</td><td>6</td></tr><tr><td>7</td><td>7</td><td>7</td><td>7</td><td>7</td><td>7</td><td>7</td><td>7</td></tr><tr><td>8</td><td>8</td><td>8</td><td>8</td><td>8</td><td>8</td><td>8</td><td>8</td></tr></table> ... |
| ASSIGNMENT PATTERN 2 | <table><tr><td>1</td><td>4</td><td>7</td><td>2</td><td>5</td><td>8</td><td>3</td><td>6</td></tr><tr><td>2</td><td>5</td><td>8</td><td>3</td><td>6</td><td>1</td><td>4</td><td>7</td></tr><tr><td>3</td><td>6</td><td>1</td><td>4</td><td>7</td><td>2</td><td>5</td><td>8</td></tr><tr><td>4</td><td>7</td><td>2</td><td>5</td><td>8</td><td>3</td><td>6</td><td>1</td></tr><tr><td>5</td><td>8</td><td>3</td><td>6</td><td>1</td><td>4</td><td>7</td><td>2</td></tr><tr><td>6</td><td>1</td><td>4</td><td>7</td><td>2</td><td>5</td><td>8</td><td>3</td></tr><tr><td>7</td><td>2</td><td>5</td><td>8</td><td>3</td><td>6</td><td>1</td><td>4</td></tr><tr><td>8</td><td>3</td><td>6</td><td>1</td><td>4</td><td>7</td><td>2</td><td>5</td></tr></table> ... |
| ASSIGNMENT PATTERN 3 | <table><tr><td>6</td><td>4</td><td>1</td><td>3</td><td>1</td><td>1</td><td>4</td><td>1</td></tr><tr><td>7</td><td>5</td><td>2</td><td>4</td><td>2</td><td>2</td><td>5</td><td>2</td></tr><tr><td>8</td><td>6</td><td>3</td><td>5</td><td>3</td><td>3</td><td>6</td><td>3</td></tr><tr><td>1</td><td>7</td><td>4</td><td>6</td><td>4</td><td>4</td><td>7</td><td>4</td></tr><tr><td>2</td><td>8</td><td>5</td><td>7</td><td>5</td><td>5</td><td>8</td><td>5</td></tr><tr><td>3</td><td>1</td><td>6</td><td>8</td><td>6</td><td>6</td><td>1</td><td>6</td></tr><tr><td>4</td><td>2</td><td>7</td><td>1</td><td>7</td><td>7</td><td>2</td><td>7</td></tr><tr><td>5</td><td>3</td><td>8</td><td>2</td><td>8</td><td>8</td><td>3</td><td>8</td></tr></table> ... |

IMAGE PROCESSING APPARATUS, THRESHOLD MATRIX GENERATION APPARATUS, CONTROL METHODS THEREFOR, AND NON-TRANSITORY COMPUTER-READABLE STORAGE MEDIUM

BACKGROUND OF THE INVENTION

Field of the Invention

The present invention relates to an image processing apparatus, a threshold matrix generation apparatus, control methods therefor, and a non-transitory computer-readable storage medium.

Description of the Related Art

There is generally known an inkjet recording apparatus as an output device of a computer. The inkjet recording apparatus includes a recording head in which a plurality of ink orifices (nozzles) are arrayed, and forms a desired image on a recording medium by relatively moving the recording head with respect to the recording medium and discharging ink droplets (dots) from the nozzles. Since print productivity is particularly required for inkjet printers for commercial printing, many of them adopt a single-pass drawing system (to also be called a full line system or full multi system). In the drawing method with a single pass, a long line head including a nozzle array covering the entire range of a drawing region in the widthwise direction of the recording medium, which intersects a direction in which the recording medium is conveyed, is used. The direction in which the recording medium is conveyed will be referred to as a "conveyance direction" or "X direction" hereinafter. The widthwise direction of the recording medium will be referred to as a "recording medium widthwise direction" or "Y direction" hereinafter. Since the recording medium need only be moved relatively with respect to the line head only once, the single-pass drawing system has a feature that a printing speed is high, as compared with a multi-pass system for completing an image by a plurality of scans.

In printing by such printer, image processing, that is, so-called halftone processing for representing, by ON/OFF of dots, tone values of original image data to be printed is performed. The printer executes print processing in accordance with the image data having undergone the halftone processing. There are proposed various methods for the halftone processing. One of representative methods is a dither method. In the dither method, a dither matrix of a predetermined size in which different thresholds are arranged is repeatedly deployed on image data in a tile pattern, and the magnitude of a tone value (pixel value) of an input image is compared with the magnitude of a corresponding threshold. Then, if the tone value is larger than the threshold, a corresponding dot is turned on; otherwise a corresponding dot is turned off, thereby implementing a tone representation.

In the dither method, the number of discharge dots (discharge frequency) may vary between nozzles in a dot pattern generated by the dither matrix. The lifetime of a nozzle with a high discharge frequency is short, thereby shortening the lifetime of the head itself. Japanese Patent Laid-Open No. 2020-015303 (to be referred to as patent literature 1 hereinafter) discloses a technique of suppressing the variation of the number of discharge dots between nozzles by using a dither matrix that makes the numbers of discharge dots for the respective nozzles even.

SUMMARY OF THE INVENTION

One aspect of the present invention provides a technique of making the use frequencies of nozzles more even at the time of recording an image by a plurality of nozzle arrays.

According to one aspect of the present invention, there is provided an image processing apparatus for generating data for forming an image corresponding to multi-valued input image data on a recording medium using a recording head in which L (L is not smaller than 2) nozzle arrays each including a plurality of nozzles arrayed in a first direction are arranged in a second direction intersecting the first direction, the apparatus comprising: a conversion unit configured to convert, based on a threshold matrix in which thresholds are arrayed, the input image data into a first dot pattern representing dots recorded by the recording head; and an assignment unit configured to obtain a second dot pattern representing dots recorded by each of the nozzle arrays by assigning the dots of the first dot pattern to each of the nozzle arrays so that each nozzle of the recording head is used in a cycle of L, wherein a power spectrum in a frequency domain of the first dot pattern has a blue noise characteristic or a green noise characteristic in which power in a low frequency band is suppressed, and power is suppressed at a frequency corresponding to the cycle of L in the second direction and at frequencies of multiplications of the frequency.

Further features of the present invention will become apparent from the following description of exemplary embodiments with reference to the attached drawings.

BRIEF DESCRIPTION OF THE DRAWINGS

FIG. 6 is a view showing an example of pseudo halftone data applicable to the embodiment;

FIG. 7 is a table showing an example of a nozzle division pattern applicable to the embodiment;

FIG. 9 is a view for explaining the result of the nozzle assignment processing according to the embodiment;

FIG. 10 is a table showing an example of a nozzle division pattern applicable to a modification of the embodiment;

FIG. 13 is a table for explaining the arrangement of nozzle assignment processing according to another embodiment.

DESCRIPTION OF THE EMBODIMENTS

Figure 1:
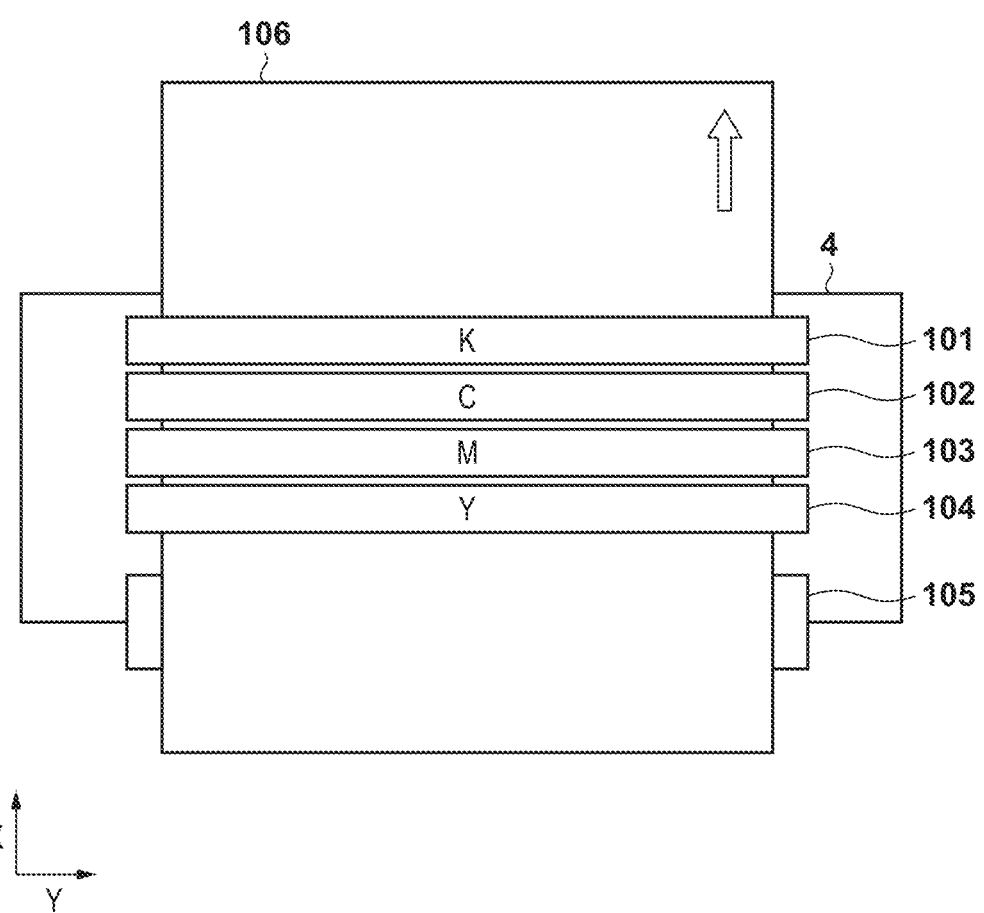
FIG. 1 is a view schematically showing an inkjet printer according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In recent years, a recording apparatus including, for each color ink, a plurality of nozzle arrays in the X direction, each of which covers the entire range of a drawing region in the Y direction, has appeared on the market. If, for example, recording is executed by eight nozzle arrays with respect to one color ink, even if the driving frequency of each nozzle array is the same as in a case where recording is executed by one nozzle array, the scan speed of the nozzle arrays can be increased eight times, and thus the recording speed can be increased eight times. However, patent literature 1 does not consider the number of discharges for each nozzle array when assigning recording dots to the plurality of nozzle arrays. Therefore, if the dot pattern generated using the dither matrix of patent literature 1 is assigned to the plurality of nozzle arrays, the numbers of discharge dots for the nozzle arrays are not even.

Furthermore, it is possible to generate a dot pattern in which the numbers of discharges for the nozzle arrays are made even, by preparing eight dither matrices described in patent literature 1 for the respective nozzle arrays, dividing multi-valued data before quantization processing into eight data, and quantizes the data by the dither matrices, respectively. However, with respect to the dot pattern obtained by combining the dot patterns for the respective nozzle arrays, the dispersibility of a dot arrangement is not considered, which may degrade the image quality such as graininess.

FIG. 1 is a view schematically showing an inkjet printer (inkjet recording apparatus) according to an embodiment. As shown in FIG. 1, a printer 4 includes recording heads 101 to 104 arranged on a frame composing the structure material of the printer. The recording heads 101 to 104 are so-called full-line recording heads, in each of which a plurality of nozzles for discharging each of a plurality of inks of black, cyan, magenta, and yellow are arrayed in a predetermined direction in a range corresponding to the width of a recording sheet 106. The resolution of a nozzle arrangement in each nozzle array is, for example, 1200 dpi. Black, cyan, magenta, and yellow may sometimes be referred to as B, C, M, and Y, respectively, hereinafter. The recording sheet 106 as a recording medium is conveyed in the direction (X direction) of an arrow in FIG. 1 when a conveyance roller 105 (and another roller (not shown)) rotates by the driving force of a motor (not shown). For example, an image for one recording sheet 106 can be recorded by an ink discharge operation repeated by the recording heads 101 to 104 with respect to the conveyed recording sheet 106.

Figure 2:
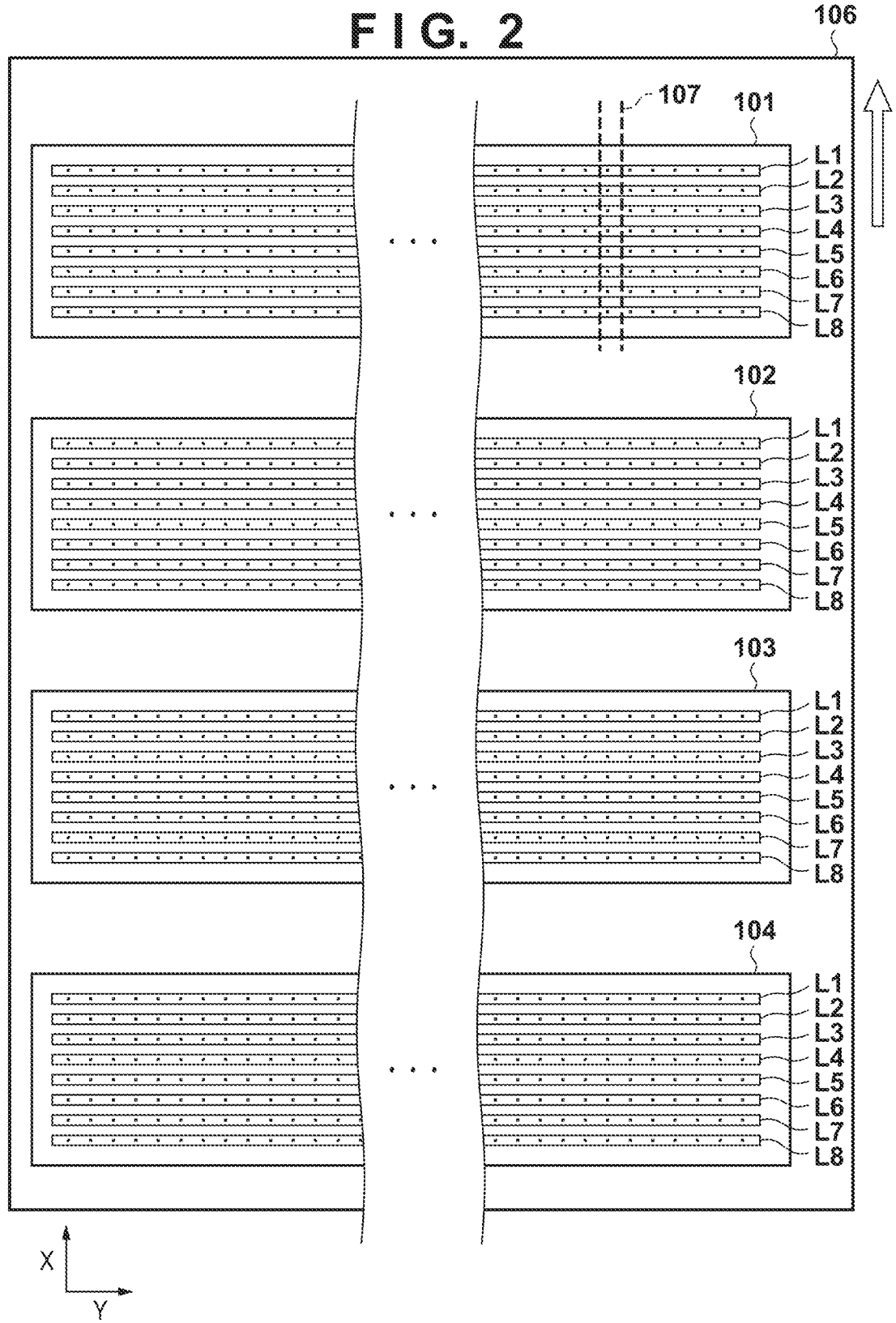
FIG. 2 is a view schematically showing recording heads according to the embodiment.

As shown in FIG. 2, each of the recording heads 101 to 104 has an arrangement in which L (L is 2 or more) nozzle arrays each including a plurality of nozzles for recording ink droplets in the recording medium widthwise direction (Y direction) are arranged in the conveyance direction (X direction) orthogonal to the recording medium widthwise direction. Each of the recording heads 101 to 104 discharges ink to the recording medium that relatively moves in the direction (X direction) of the arrow, and records an image by sharing, by the plurality of nozzle arrays, recording dots of the same line (a line in the X direction) on the recording medium. This embodiment assumes that the number L of nozzle arrays is 8 (L1, L2, L3, L4, L5, L6, L7, and L8). A discharge energy generation unit such as a heater is provided in each nozzle of each nozzle array forming each of the recording heads 101 to 104, and power for driving the heaters is supplied via a wiring different for each nozzle array. By focusing on a recording line 107 of interest as one recording line of a given color component, recording at a dot position of the recording line 107 of interest is executed by discharge or non-discharge of a nozzle belonging to one of the nozzle arrays (L1 to L8).

(Apparatus Arrangement)

Figure 3:
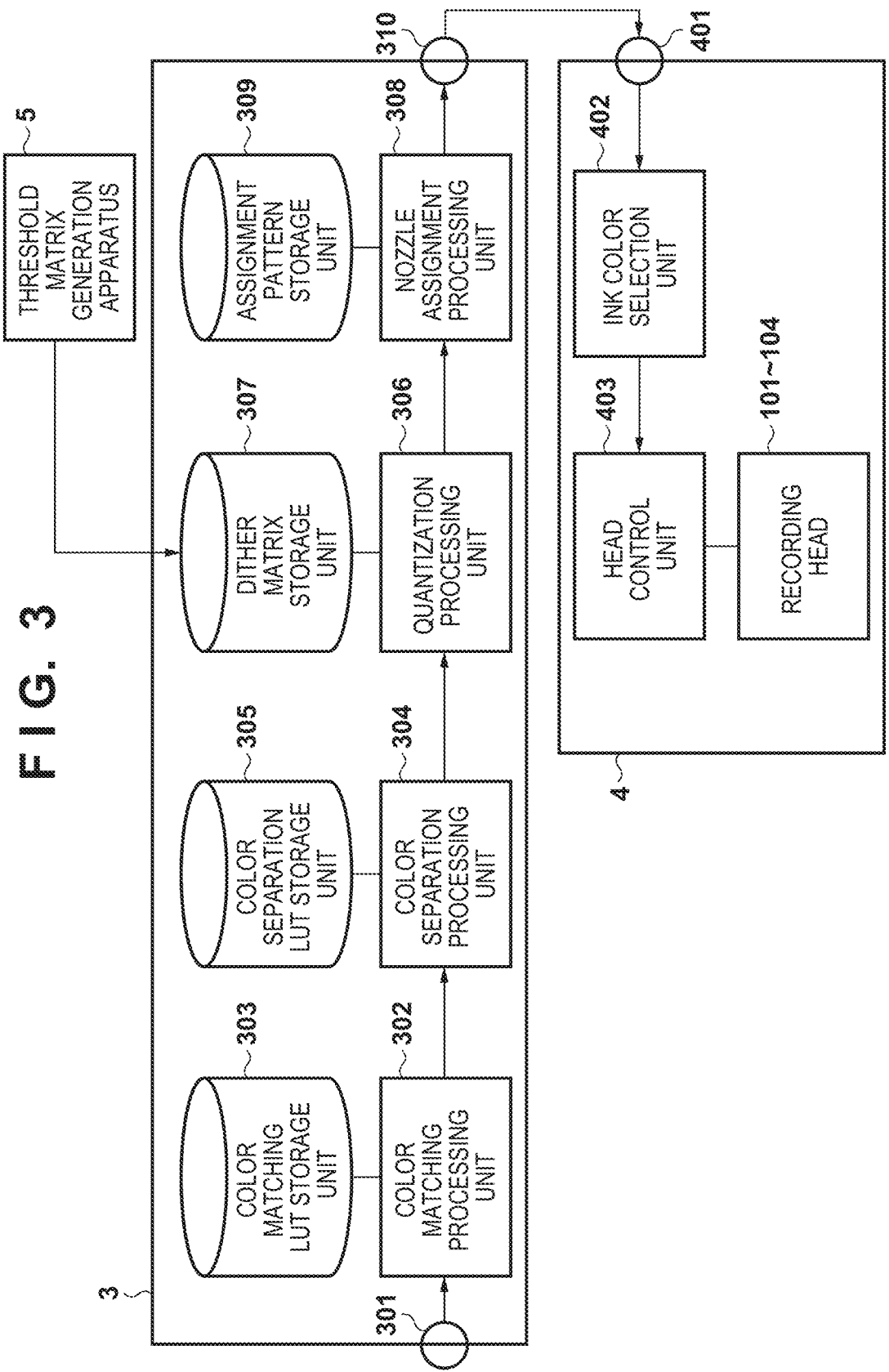
FIG. 3 is a block diagram showing an example of the functional arrangement of a recording system according to the embodiment.

FIG. 3 is a block diagram showing the arrangement of an image forming system according to this embodiment. Referring to FIG. 3, the image forming system includes an image processing apparatus 3 and the printer 4. Note that the image processing apparatus 3 can be implemented by, for example, a printer driver installed on an information processing apparatus such as a general personal computer. In this case, each functional unit of the image processing apparatus 3 to be described below is implemented when the computer (processor) executes a predetermined program. As another arrangement, for example, the printer 4 may include at least some of the functional units of the image processing apparatus 3 shown in FIG. 3. The image processing apparatus 3 and the printer 4 are connected by a printer interface or a circuit. The image processing apparatus 3 obtains print target image data from an image data input terminal 301. The image data is, for example, an 8-bit RGB color image.

A color matching processing unit 302 performs color matching processing for the input RGB image data to correct the color of the RGB image data. With the color matching processing, even if a recording medium or a printer having a different color reproduction characteristic is used, uniform color reproduction can be obtained. In the color matching processing, the color matching processing unit 302 refers to a three-dimensional color matching LUT stored in a color matching LUT storage unit 303. In the color matching LUT, for example, RGB values are described on thinned lattice points of 17×17×17 points. The color matching processing unit 302 calculates values between the lattice points by linear interpolation of the color matching LUT.

A color separation processing unit 304 generates, from the image data corrected by the color matching processing unit 302, 8-bit ink value images of four planes corresponding to four color inks provided in the printer 4. In this embodiment, the recording heads 101 to 104 record an image using four color inks of cyan (C), magenta (M), yellow (Y), and black (K). In color separation processing, the color separation processing unit 304 refers to a three-dimensional color separation LUT stored in a color separation LUT storage unit 305. In the color separation LUT, for example, the color material amount values (ink values) of the four color inks are described on thinned lattice points of 17×17×17 points. The color separation processing unit 304 calculates values between the lattice points by linear interpolation of the color separation LUT.

A quantization processing unit 306 converts the multi-valued data (ink value image) corresponding to each color obtained by the color separation processing unit 304 into image data (dot pattern) of the number of tones smaller than the number of input tones with two or more values. In this embodiment, the quantization processing unit 306 performs quantization by comparison processing between the ink value image and a dither matrix for each ink color stored in a dither matrix storage unit 307. The dither matrix is an example of a threshold matrix in which thresholds are arranged to have a predetermined characteristic, and can have various shapes and sizes of 512×512 pixels, 256×256 pixels, and 256×512 pixels. In this embodiment, as an example of the threshold matrix, a dither matrix of 64×64 pixels in which thresholds of 0 to 4,095 are arranged is used. The dither matrix is repeatedly arranged on the entire image data in a tile pattern. This makes one of the thresholds of the dither matrix correspond to each of all the pixels. The quantization processing unit 306 decides recording (1) or non-recording (0) of a dot at each pixel position (dot position) by comparing each pixel value of the ink value image of each color with the corresponding threshold of the dither matrix of the corresponding ink color, thereby generating a dot pattern. A threshold matrix generation apparatus 5 includes a processor (for example, a CPU) and a memory (neither of which is shown), and implements various kinds of processes when the processor executes programs stored in the memory. The threshold matrix generation apparatus 5 generates a dither matrix for each ink color, and stores it in the dither matrix storage unit 307. The threshold matrix generation apparatus 5 may be separated from the image processing apparatus 3, or may be incorporated as part of a function executed by the image processing apparatus 3. A method of generating a threshold matrix (dither matrix in this example) by the threshold matrix generation apparatus 5 will be described later.

A nozzle assignment processing unit 308 divides the image data (dot pattern) quantized by the quantization processing unit 306 based on a nozzle assignment pattern corresponding to each of the nozzle arrays (L1 to L8) of the recording heads 101 to 104. The nozzle assignment pattern is stored in an assignment pattern storage unit 309. In this embodiment, the nozzle assignment pattern is a binary pattern in which values of 1 and 0 are arranged as information indicating whether dot assignment is possible. The nozzle assignment processing unit 308 obtains a dot pattern recorded by each of the nozzle arrays (L1 to L8) by obtaining the logical product of the assignment pattern and the image data (dot pattern). To make the nozzle assignment pattern correspond to all the pixels of the image data, the nozzle assignment pattern is repeatedly arranged on the entire image data (dot pattern) in a tile pattern. Note that a size Tx in the X direction of the nozzle assignment pattern is desirably an integer multiple of the number of nozzle arrays so that dots are equally assigned to the nozzle arrays (L1 to L8). Furthermore, the size Tx in the X direction is desirably a submultiple of a size Sx in the X direction of the dither matrix so as not to interfere with the size of the dither matrix when the nozzle assignment pattern is repeatedly arranged in a tile pattern. Alternatively, the size Sx in the X direction of the dither matrix may be a multiple of the size Tx in the X direction of the nozzle assignment pattern. As a size Ty in the Y direction of the nozzle assignment pattern, various sizes are applicable. The dot pattern for each nozzle array generated by the nozzle assignment processing unit 308 is output from an output terminal 310 to the printer 4.

The printer 4 forms, on the recording medium, the dot pattern generated by the image processing apparatus 3. In this embodiment, as recording heads, the recording heads 101, 102, 103, and 104, shown in FIG. 1, adopting an inkjet method or the like are used. Each of the recording heads 101 to 104 is a long line head in which a plurality of nozzles for discharging ink are arranged to cover the entire range of a drawing region in the recording medium widthwise direction, and forms a print image by discharging the ink while relatively moving the recording medium. In this embodiment, four color inks of cyan (M), magenta (M), yellow (Y), and black (K) are mounted on the recording heads 101, 102, 103, and 104, respectively. An input terminal 401 receives, from the image processing apparatus 3, the quantized image data indicating the dot pattern assigned for each nozzle array, and transfers the data to an ink color selection unit 402.

The ink color selection unit 402 selects an ink color corresponding to the dot pattern for each nozzle array from the ink colors mounted on the recording heads 101, 102, 103, and 104. A head control unit 403 generates a driving signal for controlling each of the recording heads 101, 102, 103, and 104 to record the dot pattern for each nozzle array with the selected ink color. Each of the recording heads 101, 102, 103, and 104 actually records each ink dot on the recording medium based on the driving signal.

Note that the processing units shown in FIG. 3 do not limit the division between processes performed by the image processing apparatus 3 and processes performed by the printer 4. For example, if the image processing apparatus 3 performs processes up to the quantization processing, the quantized dot pattern is transferred to the printer 4, and the printer 4 performs the nozzle assignment processing. Depending on the performance of the printer 4, the printer 4 can directly receive multi-valued RGB image data, and execute all the processes of the color matching processing unit 302 to the nozzle assignment processing unit 308.

(Image Processing Procedure)

Figure 4:
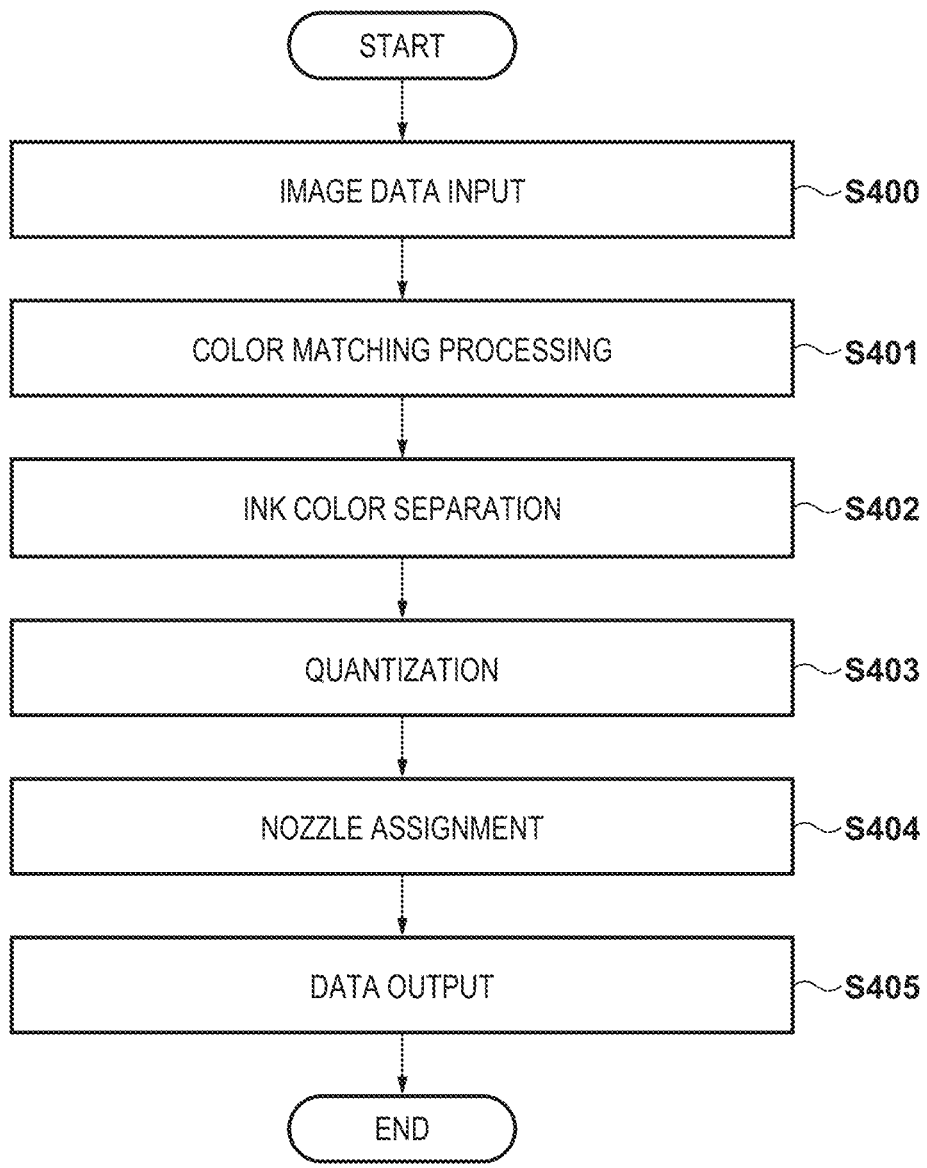
FIG. 4 is a flowchart illustrating image processing according to the embodiment.

FIG. 4 is a flowchart for explaining image data processing by the image processing apparatus 3 shown in FIG. 3. First, the image processing apparatus 3 obtains an input image from the image data input terminal 301 (step S400). The color matching processing unit 302 performs color matching processing for the input image (image data) obtained via the image data input terminal 301 (step S401). In the color matching processing, the color matching processing unit 302 refers to the three-dimensional color matching LUT stored in the color matching LUT storage unit 303. The color separation processing unit 304 generates color-separated ink value image data from the image data having undergone the color matching processing by the color matching processing unit 302 (step S402). In the color separation processing, the three-dimensional color separation LUT stored in the color separation LUT storage unit 305 is referred to. The quantization processing unit 306 obtains the color-separated ink value image data to perform quantization processing of converting the data into a binary dot pattern (step S403). In the quantization processing, the two-dimensional dither matrix stored in the dither matrix storage unit 307 is referred to.

Figure 5:
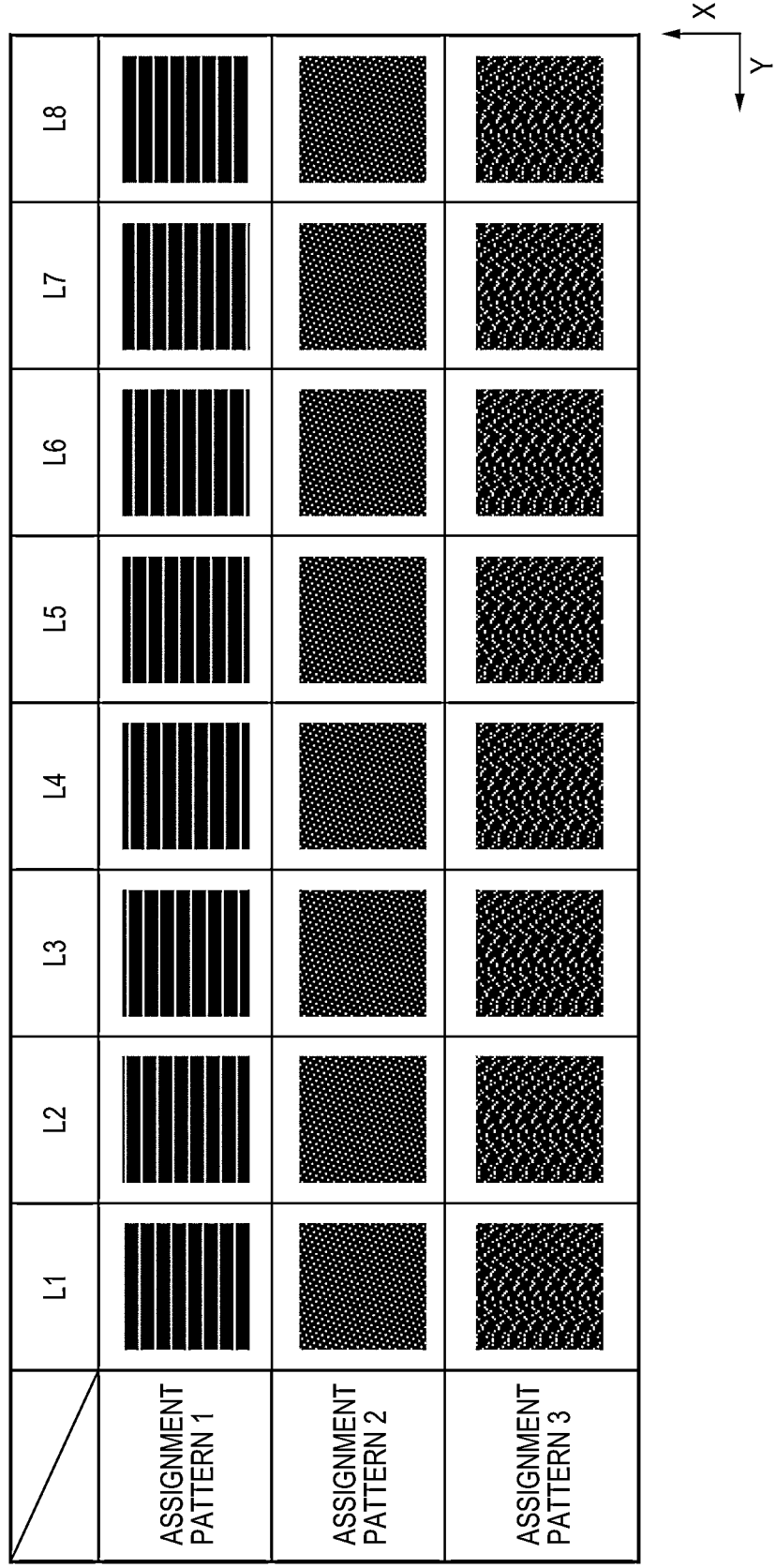
FIG. 5 is a table for explaining nozzle assignment processing according to the embodiment.

Next, the nozzle assignment processing unit 308 performs nozzle assignment processing of dividing the dot pattern having undergone the quantization processing into dot patterns for the respective nozzle arrays based on the nozzle assignment pattern stored in the assignment pattern storage unit 309 (step S404). FIG. 5 shows three examples of the nozzle assignment pattern for the nozzle arrays (L1 to L8). Each nozzle assignment pattern exemplified in FIG. 5 has a size of 64×64, in which a white pixel (pixel value=1) indicates a position where a dot can be assigned and a black pixel (pixel value=0) indicates a position where a dot cannot be assigned. Assignment pattern 1 shown in FIG. 5 is a pattern of assigning dots at the same position in the X direction so that the same nozzle array continuously discharges ink in the Y direction. Assignment pattern 2 is a pattern of assigning dots at the same position in the X direction so the same nozzle array does not continuously discharge ink in the Y direction. Assignment pattern 3 is a pattern of performing irregular assignment. In all the assignment patterns, assignment can be performed, for each array, in a cycle of 8 pixels which is equal to the number of nozzle arrays (L1 to L8), and pixels that can be assigned to each of the nozzle arrays are exclusive by shifting the same pattern in the X direction by one pixel for each of the nozzle arrays (L1 to L8).

Referring back to FIG. 4, the dot pattern for each nozzle array after the nozzle assignment processing is output, from the output terminal 310, in an arbitrary size for the entire image or a bandwidth of each unit recording region (step S405). The series of image processes by the image processing apparatus 3 is then completed.

(Details of Nozzle Assignment Processing)

Figure 7:
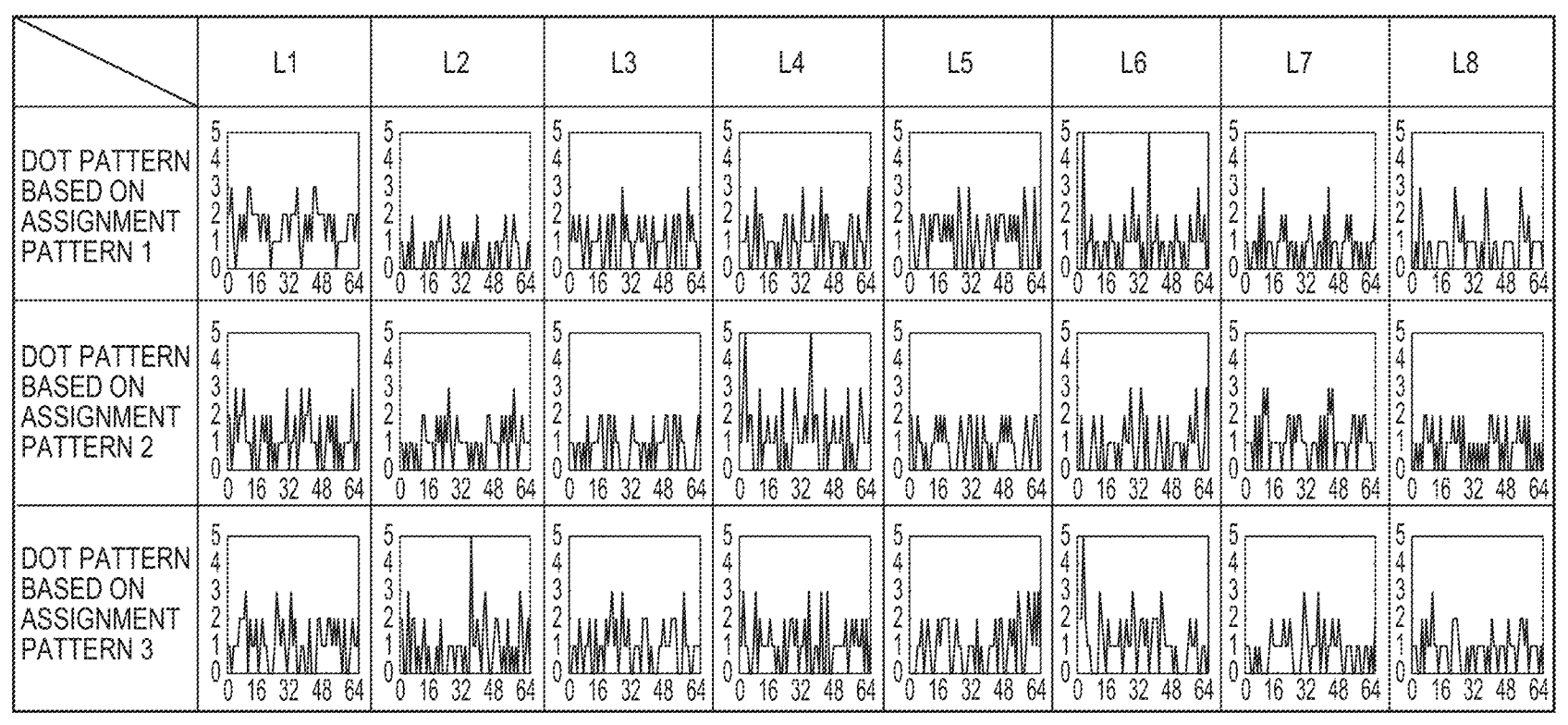

The present applicant has found a problem that if the nozzle assignment processing for executing recording by the plurality of nozzle arrays is performed for the dot pattern generated by the conventional quantization processing, the numbers of discharge dots for the nozzle arrays are not even. This problem will be described with reference to FIGS. 6 and 7. A dot pattern 6a shown in FIG. 6 shows an example of a dot pattern before nozzle assignment, which has been generated by performing the quantization processing using a dither matrix having a size of 64×64 generated based on the conventional technique. A table 6b shows a result of obtaining dot patterns for the respective nozzle arrays having undergone nozzle assignment in accordance with nozzle assignment patterns 1 to 3 shown in FIG. 5. FIG. 7 shows a result of counting the number of dots (the number of dots in the X direction) discharged by each of the plurality of nozzles arranged in the Y direction with respect to each dot pattern shown in the table 6b of FIG. 6. In each graph, the abscissa represents a nozzle position (a position in the Y direction), and the ordinate represents the number of dots.

As shown in FIG. 7, it can be confirmed that if the nozzle assignment processing for executing recording by the plurality of nozzle arrays is performed for the dot pattern 6a that does not consider dot assignment for each nozzle array, the number of discharge dots varies between the nozzle arrays. In the example shown in FIG. 7, the number of discharge dots varies within a range of 0 to 5 dots. This variation shortens the lifetime of a nozzle that often discharges ink, thereby shortening the lifetime of the recording head itself. To solve this problem, in this embodiment, quantization processing is executed using a dither matrix considering dot assignment for each nozzle array, thereby generating a pattern in which the variation of the number of discharge dots between the nozzle arrays after nozzle assignment is suppressed.

(Dither Matrix Generation Method)

A dither matrix generation method used in this embodiment will be described. In the following description, M represents a dither matrix in a generation step or a generated dither matrix. The dither matrix M is a two-dimensional array having a size of Sx rows in the X direction (conveyance direction) and a size of Sy columns in the Y direction (recording medium widthwise direction) (Sx and Sy are natural numbers). The size (Sx, Sy) of the dither matrix M is arbitrary but the size Sx in the X direction (conveyance direction) is desirably a multiple of the number of nozzle arrays. An example in which the number of nozzle arrays is 8, Sx is 64 pixels, and Sy is 64 pixels will be described below.

As a method of generating a dot dispersion dither matrix, the void-and-cluster method is known. In the void-and-cluster method, a smoothing density image is obtained by applying a low-pass filter, an arrangement point at which a dot is to be added is decided based on the smoothing density image to suppress a local density variation, and these operations are repeated, thereby generating a dither matrix representing each tone. In this embodiment as well, a dither matrix having the dot dispersion blue noise characteristic (or green noise characteristic) is generated by the similar method.

A dot pattern generated in the repetition process of generating the dither matrix M is represented by d(x, y). The dot pattern d(x, y) represents a two-dimensional array, and has a size equal to that of a dither matrix M(x, y). The value of each pixel of the dot pattern d(x, y) is 1 in a case where a dot is present, and is 0 in a case where no dot is present. The dot pattern d(x, y) changes in the repetition process. In the repetition process, Sx×Sy+1 dot patterns from a dot pattern whose number of dots is 0 to a dot pattern whose number of dots is Sx×Sy are generated. Thus, if g represents the number of dots in the dot pattern d(x, y), a given point of time (tone value) in the repetition process can be specified using g. In the following description, the number g of dots will be referred to as a tone value g. Furthermore, in the following description, the dot pattern d(x, y) in a case where the tone value is g will be referred to as d(g, x, y) or d(g) by omitting "x, y".

A density variation map of the tone value g to be used to evaluate the density of dots generated in the repetition process is represented by n(g). In the density variation map n(g), a position where a value is smaller is evaluated as a position where the smoothing density is lower and the density of dots is lower. Conversely, a position where a value is larger is evaluated as a position where the smoothing density is higher and the density of dots is higher. In processing in step S103 of FIG. 8 to be described later, at a position where a value is smallest in the density variation map n(g), that is, at a position where the density of dots is lowest, a dot is added. This suppresses a density variation in the generated dot pattern, thereby implementing low graininess.

The density variation map n(g) is a two-dimensional array having a size equal to that of the dot pattern d(g), and values in the array change in accordance with the tone value g, similar to the dot pattern d(g). In the following description, n(g) will also be referred to as n(g, x, y). In step S102 (FIG. 8) to be described later, the density variation map n(g) is generated by performing filter processing for the dot pattern d(g). Since it is assumed that the dither matrix is cyclically applied to the input image, the density variation map n(g) is generated by using the cyclic convolution result of the dot pattern d(g) and a filter coefficient in the filter processing in step S102 to be described later. The cyclic convolution is an operation of performing normal convolution between the filter coefficient and the dot pattern d(g) set with a cyclic boundary condition. Note that the filter coefficient used in step S102 will be described in detail later.

Figure 8:
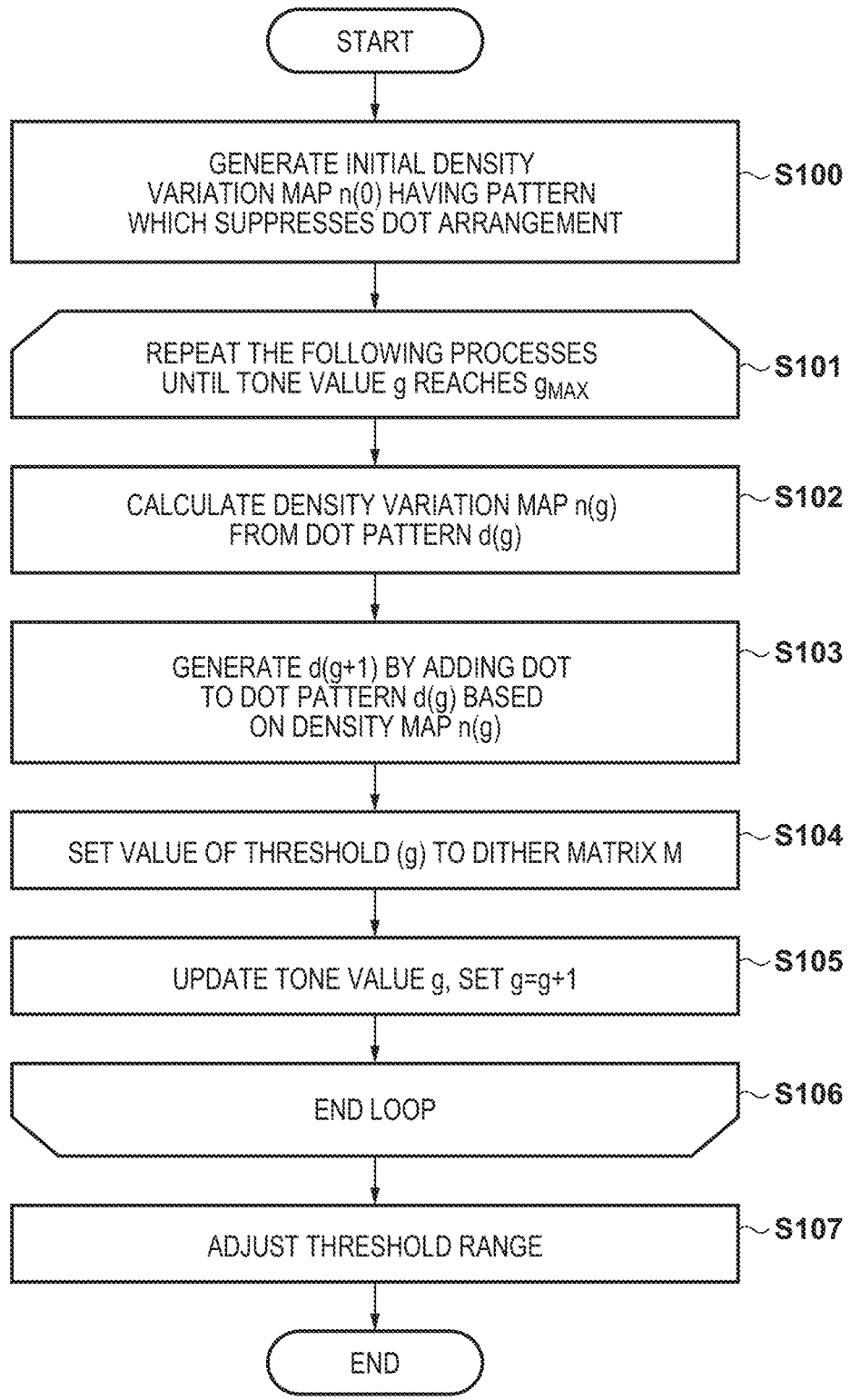
FIG. 8 is a flowchart illustrating nozzle assignment processing according to the embodiment.

Next, the dither matrix generation method according to this embodiment will be described with reference to FIG. 8. FIG. 8 is a flowchart illustrating the overall procedure of the dither matrix generation method according to this embodiment.

In step S100, an initial density variation map n(0) in a case where the tone value g is 0 is generated. In this embodiment, as given by equation (1) below, random numbers (rand) with a small amplitude for preventing a regular pattern are given to the initial density variation map n(0).

$$n(0, x, y) = \text{rand} \tag{1}$$

Steps S101 to S106 indicate processes repeated to add a dot to the dot pattern d(g). Steps S101 and S106 are loop limits, and indicate that processes in steps S102 to S105 are repeated until the tone value g reaches $g_{MAX}$ from 0. In the processes in steps S102 to S105, the tone value g is added to the dither matrix M while one dot is added to the dot pattern d(g) of the tone value g to generate a dot pattern d(g+1) of the adjacent tone, that is, a tone value g+1. This embodiment assumes $g_{MAX}$=Sx×Sy=64×64=4096. In this way, the repetition processing is performed to add the tone value g of 1 to 4096 to the dither matrix M, thereby generating the dither matrices M and dot patterns of all tones.

The threshold matrix generation apparatus 5 applies the filter coefficient (to be described later) to the dot pattern d(g) corresponding to the tone value g, thereby calculating the density variation map n(g) (step S102). The threshold matrix generation apparatus 5 decides, as an addition position, a position ($x_{MIN}$, $y_{MIN}$) where the value in the density variation map n(g, x, y) is smallest among positions that are OFF in the dot pattern d(g, x, y) (step S103). The threshold matrix generation apparatus 5 adds a dot at the position d(g, $x_{MIN}$, $y_{MIN}$) corresponding to the addition position in the dot pattern d(g) (step S103). The dot pattern added with the dot is the dot pattern d(g+1) of the tone value g+1. Next, the threshold matrix generation apparatus 5 sets, to the tone value g, a value in the dither matrix M(x, y) corresponding to the addition position ($x_{MIN}$, $y_{MIN}$) of the dot (step S104). After that, the threshold matrix generation apparatus 5 increments the tone value g to obtain g+1 (step S105). The threshold matrix generation apparatus 5 repeats the above processes in step S102 to S105 until the threshold g reaches $g_{MAX}$, thereby generating a threshold matrix (dither matrix) set with thresholds of 1 to 4096.

After the dither matrix is obtained by the above repetition processing, the threshold matrix generation apparatus 5 adjusts the range of the value in the dither matrix in accordance with the range of the pixel value of the input image (step S107). In a stage before the processing in step S107 is performed, values of 1 to 4096 ($m_{MIN}$ to $m_{MAX}$) are stored in the dither matrix M(x, y). In a case where the input image when performing dither processing is an 8-bit image, the range of the input image is 0 to 255 ($th_{MIN}$ to $th_{MAX}$). Therefore, even if the dither matrix in which values of 1 to 4096 are stored is used, an appropriate halftone processing result cannot be obtained. To cope with this, the threshold matrix generation apparatus 5 adjusts the range of the threshold in the dither matrix M(x, y) in accordance with the assumed input image (step S107). For example, if it is desirable to set the range of the threshold in the dither matrix to a range of $th_{MIN}$ to $th_{MAX}$, the threshold in the adjusted dither matrix M is an integer part of a×M(x, y)+b. Note that a=($th_{MAX}$−$th_{MIN}$)/($m_{MAX}$−$m_{MIN}$) and b=$th_{MIN}$−a×$m_{MIN}$.

(Details of Generation of Density Variation Map by Filter Processing)

In step S102, the density variation map n(g) is calculated for the tone value g by applying a filter f to the dot pattern d(g) of the tone value g. The filter f includes coefficients in a two-dimensional array having a size equal to that of the dither matrix M, and details of the coefficients will be described later. In this embodiment, an image filtering operation of performing convolution for the dot pattern d(g) of the tone value g using the filter f is performed. More specifically, the value n(g, x, y) at the coordinates (x, y) in the density variation map n(g) can be calculated by, for example, equation (2) below. That is, a predetermined position (ki, kj) in the filter f is aligned with the conversion target dot position d(g, x, y) in the dot pattern of the tone value g, and then an operation (convolution) is performed using the coefficient of the filter f Note that in convolution, with respect to a portion where the filter f falls outside the dot pattern d, the operation is performed by connecting the dot patterns in the vertical and horizontal directions by circularly referring to the dot pattern. Furthermore, % represents a modulus operator. For example, "(x+i) % Sfx" represents a remainder obtained by dividing (x+i) by Sfx. To obtain the effect of the initial variation map n(0) set to avoid a regular pattern, the initial variation map is added to the operation result given by equation (2).

$$n(g, x, y) = \left( \sum_{i=-ki+1}^{ki} \sum_{j=-kj+1}^{kj} f(ki-i, kj-j) \times d(g, (x+i) \% Sfx, (y+j) \% Sfy) \right) + n(0, x, y) \quad (2)$$

$$\text{where } \left( ki = \frac{Sfx}{2}, kj = \frac{Sfy}{2} \right)$$

(Details of Filter Coefficient)

The filter f used in step S102 of this embodiment to generate the density variation map n(g) will be described next. The filter f is used to extract the density variation map n(g) from the dot pattern d(g). As described above, the filter f includes coefficients in a two-dimensional array, and is also described as f(fx, fy). In this embodiment, if the array size of the filter f is equal to that of the dither matrix M, Sfx represents the filter size in the X direction (conveyance direction), and Sfy represents the filter size in the Y direction (recording medium widthwise direction), the values of Sfx and Sfy are 64. In step S103, the density of dots is reduced by adding dots to the dot pattern d(g) to relax the density variation in the density variation map n(g), thereby implementing low graininess. To preferably implement this, it is necessary to extract the density of the dots.

In this embodiment, the filter f for extracting the density of the dots is set as a function concerning the reciprocal of a distance r from the dot given by equations (3). This makes it easy to add a dot at a position far from the position where the dot is arranged, thereby obtaining a density variation map so to prevent dots from being concentratedly arranged. Note that in this embodiment, 1 is added to the denominator to avoid division by 0 when distance r=0. In equations (3), dx and dy represent positions with reference to the center position of the filter f, and correspond to distances in the X direction and the Y direction from the center position of the filter f, respectively. r(dx, dy) indicates the distance r from the center of the filter f to the position (dx, dy). f(fx, fy) indicates a coefficient at the position (fx, fy) in the filter f, and is a reference destination of the filter f(ki-i, kj-j) in equation (2) above.

$$r(dx, dy) = \sqrt{dx^2 + dy^2} \quad (3)$$

$$f(fx, fy) = \begin{cases} \dfrac{1}{r(fx-x_0, fy-y_0)+1} + 2 & fy-y_0 = 0 \text{ and } abs(fx-x_0) \% L = 0 \quad \text{(condition 1)} \\ \dfrac{1}{r(fx-x_0, fy-y_0)+1} + 1 & fy-y_0 = 0 \text{ and } abs(fx-x_0) \% L \neq 0 \quad \text{(condition 2)} \\ \dfrac{1}{r(fx-x_0, fy-y_0)+1} & fy-y_0 \neq 0 \quad \text{(condition 3)} \end{cases}$$

-continued $$x_0 = SFx/2, \ y_0 = SFy/2$$

$$fx = 0 \sim SFx - 1, \ fy = 0 \sim SFy - 1$$

Note that in equations (3), $x_0$ and $y_0$ represent coordinates of the center position of the filter, and $x_0$=Sfx/2 and $y_0$=Sfy/2. In equations (3), % represents a modulus operator, and abs(fx+$x_0$)% L represents a remainder obtained by dividing the absolute value of fx−$x_0$ by L. L represents the number of nozzle arrays to undergo nozzle assignment by the nozzle assignment pattern. Note that a constant value (2 or 1) added under condition 1 or 2 in equations (3) is added due to restriction on the dot arrangement in this embodiment. The constant value is not limited to 2 or 1, and any value larger than a peripheral function value is applicable. However, the constant value used when condition 1 is satisfied is larger than the constant value used when condition 2 is satisfied. Thus, in the filter f, the coefficients arranged in the X direction while passing through a position fy=$y_0$ are larger than the coefficients at other positions. Furthermore, among the coefficients arranged in the X direction, the coefficients arranged at a predetermined interval (the interval of the number L of arrays) from the position of fy=$f_0$ are larger than the remaining coefficients arranged in the X direction.

As described above, in step S102, the threshold matrix generation apparatus 5 applies the filter f generated by equations (3) to the dot pattern d(g) corresponding to the tone value g, as given by equation (2), thereby calculating the density variation map n(g) corresponding to the tone value g. Then, in step S103, the threshold matrix generation apparatus 5 decides, as a dot addition position, the position ($x_{MIN}$, $y_{MIN}$) where the value in the density variation map n(g, x, y) is smallest among the positions that are OFF in the dot pattern d(g, x, y). The threshold matrix generation apparatus 5 adds a dot at the decided addition position d(g, $x_{MIN}$, $y_{MIN}$) in the dot pattern d(g), thereby generating the dot pattern d(g+1) of the tone value g+1. As indicated by condition 2, since the value in the density variation map at the y-coordinate where the dot is arranged becomes large by using the filter coefficient added with the constant value (1) at the position of fy−$y_0$=0, it becomes difficult to add a dot, thereby suppressing the variation of a dot occurrence frequency between y positions. Furthermore, as indicated by condition 1, a filter coefficient obtained by adding the larger constant value (2) to the position of the x-coordinate where the remainder obtained by division by the distance L (8) from the center in the X direction is 0 is used at the y-coordinate where the dot is arranged. Therefore, it becomes difficult to continuously add dots at positions in an 8-pixel cycle in the X direction, and it is possible to suppress the variation of a dot occurrence frequency between the nozzle arrays when performing nozzle assignment by the nozzle assignment pattern in an 8-pixel cycle.

Note that in equation (2), the initial density map n(0) is added after performing convolution by the filter coefficient but the present invention is not limited to this. After the initial density map n(0, x, y) is added to the dot pattern (g), convolution by the filter coefficient may be performed. As a function used for the filter f, the function concerning the reciprocal of the distance r has been explained but the present invention is not limited to this. For example, a low-pass filter such as a Gaussian function that can extract frequency components perceived as granular feeling may be used. For example, as the coefficient of the filter f, the two-dimensional Gaussian function (to be referred to as 2d-gaussian(x, y) hereinafter) can be used instead of the reciprocal of the distance r. If 2d-gaussian(x, y) is used, the filter coefficient is decided by equation (4) below instead of equations (3).

$$f(fx, fy) = \begin{cases} \dfrac{2d-\text{gaussian}(fx-x_0,}{fy-y_0)+2} & \text{for } fy-y_0=0 \text{ and} \\ & \text{abs}(fx-x_0) \ \% \ L = 0 & \text{(condition 1)} \\ \dfrac{2d-\text{gaussian}(fx-x_0,}{fy-y_0)+1} & \text{for } fy-y_0=0 \text{ and} \\ & \text{abs}(fx-x_0) \ \% \ L \neq 0 & \text{(condition 2)} \\ \dfrac{2d-\text{gaussian}(fx-x_0,}{fy-y_0)} & \text{for } fy-y_0 \neq 0 & \text{(condition 3)} \end{cases} \quad (4)$$

According to the processing procedure shown in FIG. 8 described above, it is possible to provide a dither matrix for generating a dot arrangement in which recording dots can equally be assigned to the plurality of nozzles in a case where image data (a dot pattern) is divided into dot patterns for the respective nozzle arrays based on a nozzle division pattern.

(Characteristic of Generated Dot Pattern)

Figure 10:
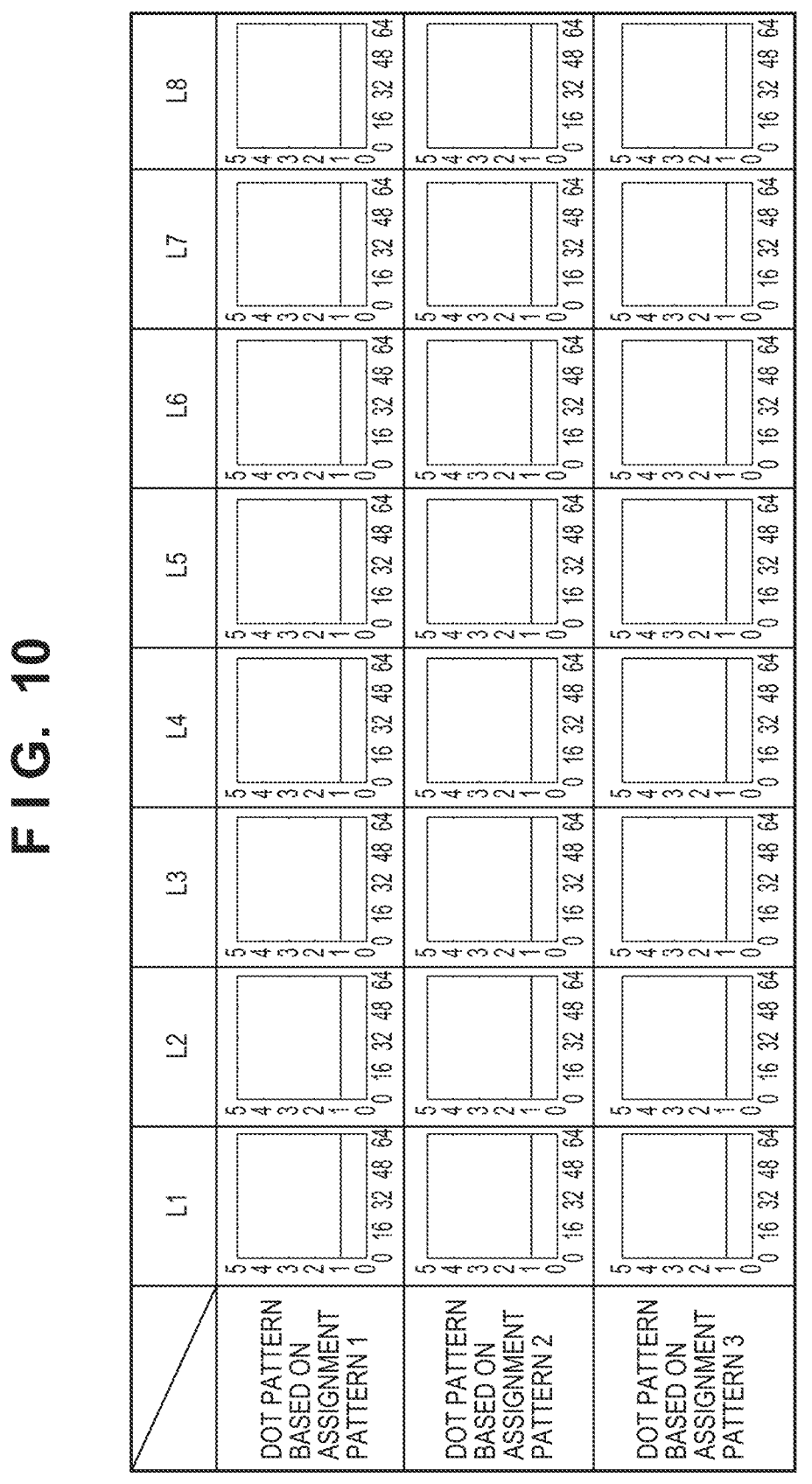

FIG. 9 is a view for explaining an effect obtained by a dot pattern generated using a dither matrix according to this embodiment. The dither matrix is generated by the processing shown in FIG. 8. A dot pattern 9a shown in FIG. 9 shows an example of a dot pattern before nozzle assignment, which has been generated by performing the quantization processing using the dither matrix having a size of 64×64 generated by the processing shown in FIG. 8. A table 9b shown in FIG. 9 shows dot patterns for the respective nozzle arrays, which are obtained as a result of performing nozzle assignment for the dot pattern 9a in accordance with nozzle assignment patterns 1 to 3 shown in FIG. 5. FIG. 10 shows a result of counting the number of dots (the number of dots in the X direction) discharged by each of the respective nozzles arrayed in the Y direction based on each dot pattern shown in the table 9b. In each graph, the abscissa represents the nozzle position, and the ordinate represents the number of dots.

As shown in FIG. 10, it is found that if at least input image data has a uniform tone, the dot patterns recorded by the respective nozzle arrays include the difference in number of dots included in the range of Sx (64 in this example) in the X direction at each position in the Y direction is equal between the nozzle arrays. Note that there may be a case where there is a difference in number of dots between the nozzle arrays, such as a case where the number of dots of the nozzle assignment processing cannot be divided by the number of nozzle arrays, but an effect of sufficiently suppressing the lifetime of the head from being shortened is obtained as long as the variation of the number of dots is suppressed to a predetermined value (for example, one dot) or less.

(Characteristic of Power Spectrum)

Figure 11:
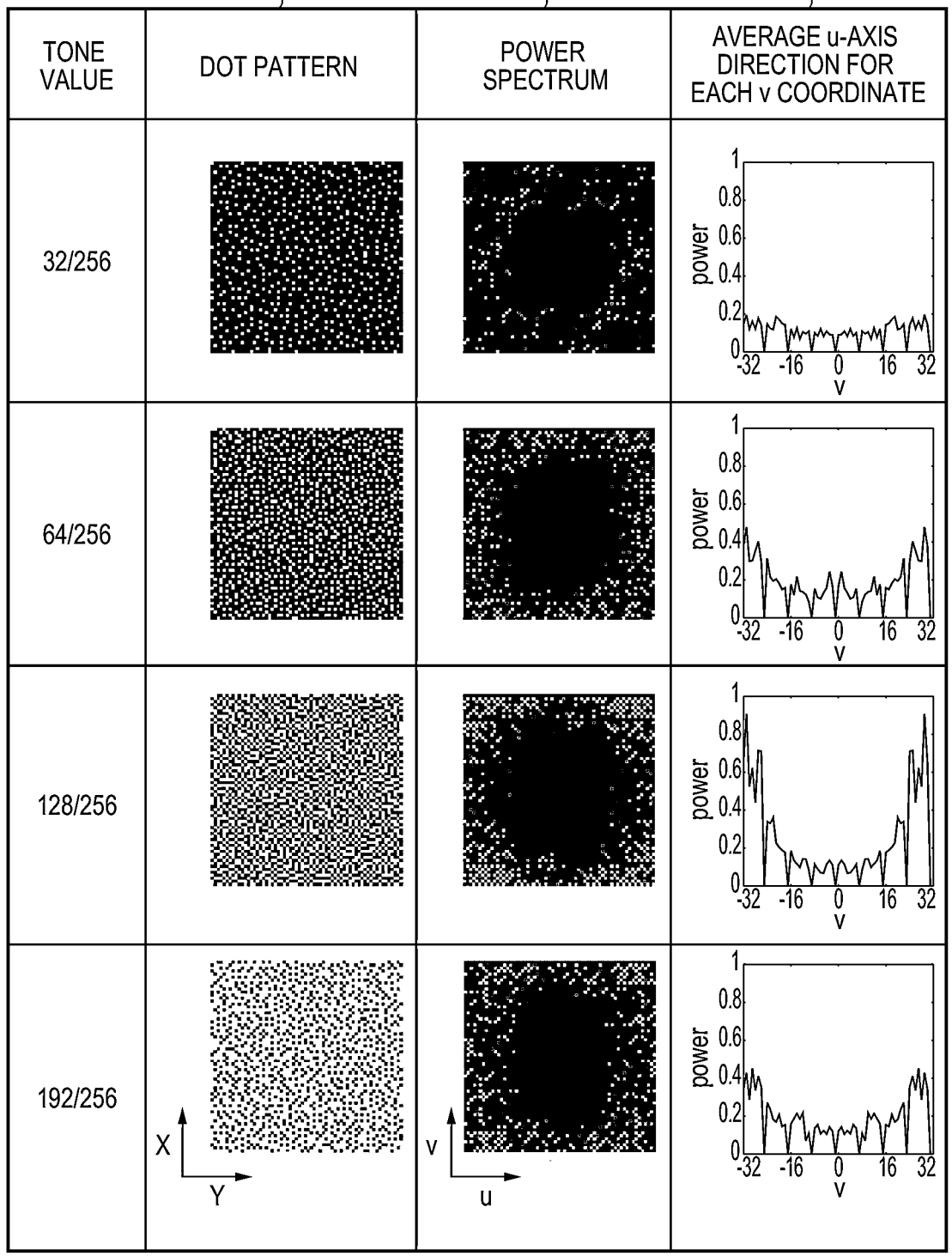
FIG. 11 is table showing an example of pseudo halftone data applicable to the modification of the embodiment.

The characteristics of the dot pattern obtained by the quantization processing unit 306 and the power spectrum of the nozzle assignment pattern used by the nozzle assignment processing unit 308 according to this embodiment will be described. First, the characteristic of the power spectrum of the dot pattern generated by the threshold matrix generation apparatus 5 using the dither matrix generated by the procedure shown in FIG. 8 will be described. Referring to FIG. 11, a column 11*a* shows a dot pattern for each of tone values of 32, 64, 128, and 192, which is generated using the dither matrix generated by the procedure shown in FIG. 8. A column 11*b* shows a power spectrum (a power spectrum in a frequency domain) that represents power (the square of the absolute value) by the gray level by performing two-dimensional Fourier transform for each dot pattern shown in the column 11*a*. In each power spectrum of the column 11*b*, the center corresponds to a direct current component, a u direction corresponds to frequency components in the Y direction of each dot pattern of the column 11*a*, a v direction corresponds to frequency components in the X direction of each dot pattern of the column 11*a*, and a white portion indicates large power. Note that the direct current component represents the number of tones (the number of dots), and will be described as 0 since it is not associated with the characteristic of the dot arrangement.

It is found from each power spectrum in the frequency domain of the column 11*b* that the power spectrum has the blue noise characteristic in which power in a low frequency band is suppressed and power is suppressed at a frequency corresponding to the cycle of L (=8), that is the number of nozzle arrays, of the frequency components in the X direction and at frequencies of multiplications of the frequency. Note that this embodiment has explained the example in which the power spectrum has the blue noise characteristic but the present invention is not limited to this. For example, a power spectrum having an acyclic characteristic such as the green noise characteristic need only be obtained.

With respect to the column 11*b* of FIG. 11, if a coordinate position obtained by setting the origin of the frequency domain as a center (0, 0) is represented by (u, v), the frequency component of the power spectrum can be represented by F(u, v). A value obtained by averaging powers in the u-axis direction for each coordinate v is set as a u-axis averaged power spectrum uAPS(v), as given by:

$$uAPS(v) = \frac{1}{W}\sum_{u} F(u, v) \quad (5)$$

where W represents the number of pixels with the same coordinate v among the frequency components F(u, v), which is equal to the width in the Y direction of the dot pattern for which the power spectrum is calculated. In the example shown in FIG. 11, W is 64 equal to the width Sy in the Y direction of the dither matrix.

A column 11*c* of FIG. 11 shows the graph of uAPS calculated from each power spectrum shown in the column 11*b*. As indicated by the column 11*c*, power at cyclic coordinates on the v-axis is suppressed in the dot pattern of this embodiment. A coordinate v m at which the power is suppressed corresponds to a frequency of an L-pixel cycle that is restricted with respect to the dot arrangement in the X direction, as given by equations (3). The coordinate v m can be obtained by:

$$v_m = \frac{H}{L} \times Z \quad (6)$$

In equation (6), H represents the width in the X direction of the dot pattern for which the power spectrum is calculated, L represents the number of nozzle arrays, and Z represents an integer ( . . . −3, −2, −1, 0, 1, 2, 3, 4, . . . ). In the example shown in FIG. 11, since H is 64 equal to the width Sy in the Y direction of the dither matrix, and the number L of nozzle arrays is 8, the coordinate $v_m$ at which the power is suppressed is calculated as −24, −16, −8, 0, 8, 16, 24, and 32. If the coordinate v that satisfies equation (6) is represented as $v_m$, and the coordinate v that does not satisfy equation (6) is represented as $v_n$, it can be confirmed from the column 11*c* of FIG. 11 that uAPS($V_m$)<uAPS($V_n$) is satisfied.

Figure 12:
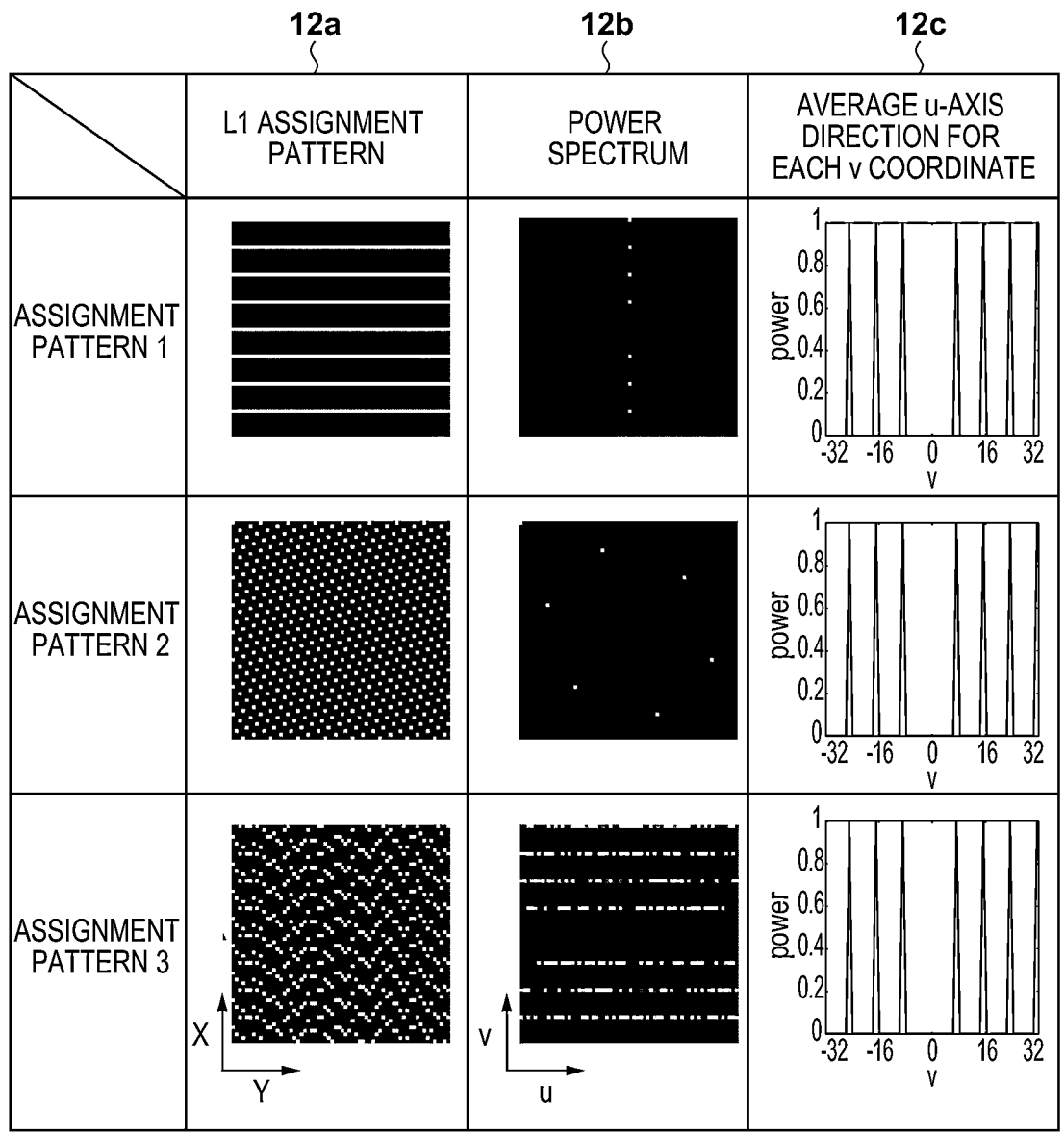
FIG. 12 is a table showing the result of nozzle assignment processing according to the modification of the embodiment.

Similar to FIG. 11, the characteristic of the power spectrum for each nozzle assignment pattern shown in FIG. 5 applied in this embodiment will be described next. In FIG. 12, a column 12*a* shows an L1 assignment pattern for each of the three kinds of nozzle assignment patterns shown in FIG. 5. A column 12*b* shows the power spectrum in the frequency domain, which represents power (the square of the absolute value) by the gray level by performing two-dimensional Fourier transform for the L1 assignment pattern shown in the column 12*a*. The L1 assignment pattern as the nozzle assignment pattern for L1 will now be described but assignment patterns for L2 to L8 are obtained by shifting the phase in the X direction with respect to the pattern for L1, and the power spectra for the assignment patterns have the same characteristic as that for the L1 assignment pattern. The column 12*b* of FIG. 12 shows the power spectrum (the power spectrum in the frequency domain) that represents power (the square of the absolute value) by the gray level by performing two-dimensional Fourier transform for the dot pattern shown in the column 12*a*. In each power spectrum, the center corresponds to a direct current component, the u direction corresponds to frequency components in the Y direction of each assignment pattern of the column 12*a*, the v direction corresponds to frequency components in the X direction of each assignment pattern of the column 12*a*, and a white portion indicates large power. Note that the direct current component represents the number of dots that can be assigned, and will be described as 0 since it is not associated with the characteristic of the assignment arrangement. As shown in the column 12*b*, the power spectrum in the frequency domain of the assignment pattern corresponds to the frequency components in the X direction, and has power at a frequency corresponding to the cycle of L that is the number of nozzle arrays and at frequencies of multiplications of the frequency.

A column 12*c* of FIG. 12 shows uAPS calculated from each power spectrum of the column 12*b*. As indicated by the column 12*c*, the nozzle assignment pattern of this embodiment has power at cyclic coordinates on the v-axis. The coordinate $v_m$ at which the power spectrum has power is a coordinate corresponding to a frequency of an L-pixel cycle that is a pixel at which nozzle assignment is possible in the X direction, as given by equation (6). In the example shown in FIG. 12, since H is 64 and the number L of nozzle arrays is 8, the coordinate $v_m$ (=H/L×Z) at which the power spectrum has power is calculated as −24, −16, −8, 0, 8, 16, 24, and 32 by equation (6). If the coordinate v that satisfies equation (6) is represented as $v_m$, and the coordinate v that does not satisfy equation (6) is represented as $v_n$, it can be confirmed from the column 12*c* of FIG. 12 that uAPS($V_m$)>0 and uAPS($V_n$)=0 are satisfied.

By using the dither matrix and the nozzle assignment pattern having the characteristics described above with reference to FIGS. 11 and 12, it is possible to equally assign the dot pattern for recording on the recording medium to the plurality of nozzle arrays based on the nozzle assignment pattern.

OTHER EMBODIMENTS

The above embodiment has explained the example in which the binary pattern in which values (1 and 0) indicating whether a dot can be assigned or not are arranged to have a predetermined characteristic is held for each of the nozzle arrays (L1 to L8), as shown in FIG. 5. However, a method of assigning dots to the nozzle arrays is not limited to this. For example, as shown in FIG. 13, a pattern in which numerical values (1 to 8) corresponding to the nozzle arrays (L1 to L8) are arrayed may be held. In this case, a nozzle assignment processing unit 308 refers to the numerical value at a corresponding pixel position in the nozzle assignment pattern, and assigns a dot to the nozzle array (L1 to L8) corresponding to the numerical value, thereby generating a dot pattern to be recorded for each nozzle array. For example, the binary pattern shown in FIG. 5 may be held as a dot deployment pattern for each nozzle array. If the dot pattern after quantization processing is ON, it is possible to similarly generate a dot pattern to be recorded for each nozzle array, by deploying a value at a corresponding pixel in the dot deployment pattern as the dot pattern for each nozzle array (L1 to L8).

Furthermore, the above embodiment has explained the example in which the quantization processing unit 306 generates a dot pattern represented by two values of ON/OFF of a dot but the present invention is not limited to this. The above embodiment is applicable to a dot pattern in which two or more dots are formed in the same pixel. For example, an input image is divided into a plurality of data, quantization processing is performed for the plurality of data using the same threshold matrix, and quantization results are added, thereby making it possible to obtain a dot pattern in which two or more dots are formed. With respect to the dot pattern of the first dot, nozzle assignment processing is performed based on a nozzle assignment pattern, similar to the above embodiment. With respect to the dot pattern of the second dot, nozzle assignment processing is performed in accordance with a nozzle assignment pattern (for example, an assignment pattern obtained by shifting the phase in the X direction by L/2 pixels) of a phase different from that for the first dot. This can equally assign the dot pattern for recording on the recording medium to the plurality of nozzle arrays.

As described above, according to each of the embodiments, the use frequencies of nozzles are made more even at the time of recording an image by the plurality of nozzle arrays.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-107357, filed Jul. 1, 2022, which is hereby incorporated by reference herein in its entirety.

What is claimed is:

1. An image processing apparatus for generating data for forming an image corresponding to multi-valued input image data on a recording medium using a recording head in which L (L is not smaller than 2) nozzle arrays each including a plurality of nozzles arrayed in a first direction are arranged in a second direction intersecting the first direction, the apparatus comprising:
   a conversion unit configured to convert, based on a threshold matrix in which thresholds are arrayed, the input image data into a first dot pattern representing dots recorded by the recording head; and
   an assignment unit configured to obtain a second dot pattern representing dots recorded by each of the nozzle arrays by assigning the dots of the first dot pattern to each of the nozzle arrays so that each nozzle of the recording head is used in a cycle of L,
   wherein a power spectrum in a frequency domain of the first dot pattern has a blue noise characteristic or a green noise characteristic in which power in a low frequency band is suppressed, and power is suppressed at a frequency corresponding to the cycle of L in the second direction and at frequencies of multiplications of the frequency.

2. The apparatus according to claim 1, wherein
   the assignment unit divides, based on an assignment pattern indicating whether dot assignment to each of the nozzle arrays is possible, the first dot pattern into the second dot patterns recorded by the respective nozzle arrays, and
   the assignment pattern is obtained by arraying an assignment pattern for assigning a dot to each of the nozzle arrays in the cycle of L in the second direction.

3. The apparatus according to claim 2, wherein
   the assignment pattern has a size Tx in the second direction, which is a positive integer multiple of L, and
   a size Sx in the second direction of the threshold matrix is a positive integer multiple of the size Tx.

4. The apparatus according to claim 3, wherein the size of the threshold matrix is equal to the size of the assignment pattern.

5. The apparatus according to claim 2, wherein the power spectrum in the frequency domain of the assignment pattern has power at the frequency corresponding to the cycle of L in the second direction and at the frequencies of the multiplications of the frequency.

6. The apparatus according to claim 2, wherein the first dot pattern obtained by the conversion unit satisfies uAPS $(v_m)$<uAPS$(v_n)$ in a case where F(u, v) represents a power spectrum in a two-dimensional frequency domain in which u represents a coordinate corresponding to the first direction and v represents a coordinate corresponding to the second direction, H represents a size in a v direction of the first dot pattern for which the power spectrum is calculated, an average of F(u, v) at the coordinate v except for a direct current component (u, v)=(0, 0) of the power spectrum is set as a u-axis averaged power spectrum uAPS(v) at the coordinate v, the coordinate v satisfying v=(H/L)×Z(Z is an integer) is represented as $v_m$, and the coordinate v not satisfying v=(H/L)×Z is represented as $v_n$.

7. The apparatus according to claim 2, wherein the assignment pattern satisfies uAPS($v_m$)>0 and uAPS($v_n$)=0 in a case where F(u, v) represents a power spectrum in a two-dimensional frequency domain in which u represents a coordinate corresponding to the first direction and v represents a coordinate corresponding to the second direction, H represents a size in a v direction of the assignment pattern for which the power spectrum is calculated, an average of F(u, v) at the coordinate v except for a direct current component (u, v)=(0, 0) of the power spectrum is set as a u-axis averaged power spectrum uAPS(v) at the coordinate v, the coordinate v satisfying v=(H/L)×Z(Z is an integer) is represented as $v_m$, and the coordinate v not satisfying v=(H/L)×Z is represented as $v_n$.

8. A recording apparatus comprising:
   an image processing apparatus defined in claim 1;
   a recording head in which L (L is not smaller than 2) nozzle arrays each including a plurality of nozzles arrayed in a first direction are arranged in a second direction; and
   a driving unit configured to drive the nozzle arrays of the recording head in accordance with a second dot pattern.

9. An image processing method of generating data for forming an image corresponding to multi-valued input image data on a recording medium using a recording head in which L (L is not smaller than 2) nozzle arrays each including a plurality of nozzles arrayed in a first direction are arranged in a second direction intersecting the first direction, the method comprising:
   converting, based on a threshold matrix in which thresholds are arrayed, the input image data into a first dot pattern representing dots recorded by the recording head; and
   obtaining a second dot pattern representing dots recorded by each of the nozzle arrays by assigning the dots of the first dot pattern to each of the nozzle arrays so that each nozzle of the recording head is used in a cycle of L,
   wherein a power spectrum in a frequency domain of the first dot pattern has a blue noise characteristic or a green noise characteristic in which power in a low frequency band is suppressed, and power is suppressed at a frequency corresponding to the cycle of L in the second direction and at frequencies of multiplications of the frequency.

10. A non-transitory computer-readable storage medium storing a program for causing a computer to execute an image processing method of generating data for forming an image corresponding to multi-valued input image data on a recording medium using a recording head in which L (L is not smaller than 2) nozzle arrays each including a plurality of nozzles arrayed in a first direction are arranged in a second direction intersecting the first direction, the method comprising:
   converting, based on a threshold matrix in which thresholds are arrayed, the input image data into a first dot pattern representing dots recorded by the recording head; and
   obtaining a second dot pattern representing dots recorded by each of the nozzle arrays by assigning the dots of the first dot pattern to each of the nozzle arrays so that each nozzle of the recording head is used in a cycle of L,
   wherein a power spectrum in a frequency domain of the first dot pattern has a blue noise characteristic or a green noise characteristic in which power in a low frequency band is suppressed, and power is suppressed at a frequency corresponding to the cycle of L in the second direction and at frequencies of multiplications of the frequency.

\* \* \* \* \*